US007966566B2

(12) United States Patent
Ritter et al.

(10) Patent No.: US 7,966,566 B2
(45) Date of Patent: Jun. 21, 2011

(54) SYSTEMS AND METHODS TO CREATE FOLLOW-UP MEETINGS

(75) Inventors: Gerd M. Ritter, Heidelberg (DE); Volkmar Stegmann, Altlussheim (DE); Ingo Pfitzner, Berlin (DE)

(73) Assignee: SAP AG, Walldorf (DE)

( * ) Notice: Subject to any disclaimer, the term of this patent is extended or adjusted under 35 U.S.C. 154(b) by 803 days.

(21) Appl. No.: 11/938,351

(22) Filed: Nov. 12, 2007

(65) Prior Publication Data

US 2009/0125818 A1    May 14, 2009

(51) Int. Cl.
*G06F 3/00* (2006.01)
(52) U.S. Cl. .......................... 715/753; 715/810; 715/781
(58) Field of Classification Search .................. 715/700, 715/762, 764, 765, 781, 810, 963, 751, 753
See application file for complete search history.

(56) References Cited

U.S. PATENT DOCUMENTS

| | | | |
|---|---|---|---|
| 5,317,683 A * | 5/1994 | Hager et al. | 715/751 |
| 6,603,489 B1 * | 8/2003 | Edlund et al. | 715/780 |
| 7,679,518 B1 * | 3/2010 | Pabla et al. | 340/573.1 |
| 2004/0168133 A1 * | 8/2004 | Wynn et al. | 715/541 |
| 2004/0243677 A1 * | 12/2004 | Curbow et al. | 709/206 |
| 2005/0038687 A1 * | 2/2005 | Galdes | 705/9 |
| 2005/0171830 A1 * | 8/2005 | Miller et al. | 705/8 |
| 2006/0200374 A1 * | 9/2006 | Nelken | 705/9 |
| 2008/0140487 A1 * | 6/2008 | Fendelman et al. | 705/8 |
| 2008/0189624 A1 * | 8/2008 | Chotai et al. | 715/753 |
| 2008/0301567 A1 * | 12/2008 | Martin et al. | 715/751 |

* cited by examiner

Primary Examiner — Xiomar Bautista
(74) Attorney, Agent, or Firm — Buckley, Maschoff & Talwalkar LLC

(57) ABSTRACT

A system may include reception of an instruction to create a next meeting based on a source meeting, the source meeting associated with a first plurality of meeting particulars, and automatically creation, in response to the instruction, of the next meeting in association with a second plurality of meeting particulars, wherein at least one of the second plurality of meeting particulars provides an indication of the source meeting.

33 Claims, 9 Drawing Sheets

SYSTEMS AND METHODS TO CREATE FOLLOW-UP MEETINGS

FIELD

Some embodiments relate to the creation of meetings within a software environment. In particular, some embodiments concern the creation of follow-up meetings within a shared scheduling system.

BACKGROUND

Software applications may facilitate collaboration and communication between employees, customers, suppliers, etc. For example, these applications may provide electronic mail exchange, calendaring functions, contact management, and meeting creation. Such software applications include activity management applications of Enterprise Resource Planning systems (e.g., SAP ERP®) and groupware applications (e.g., Microsoft Outlook®, Lotus Notes®).

Using one of the above software applications, a user may open a new meeting and associate the meeting with a subject, one or more attendees, a date and time, and a meeting venue. Other meeting particulars may be specified as well, including but not limited to an attachment, invitation text, and dial-in information. The meeting is then sent (e.g., in object form) to the one or more attendees, who each may accept or deny the meeting. If accepted by an attendee, the meeting and its associated particulars may be added to the attendee's electronic calendar.

During the actual meeting, attendees may determine that a follow-up meeting is needed. The final minutes of the meeting are therefore consumed with creating the follow-up meeting in view of the attendees' respective schedules.

To create the follow-up meeting, the meeting organizer may open a new meeting and associate each of the desired attendees with the new meeting. Association of the desired attendees may allow the meeting organizer to view the attendees' schedules. Accordingly, the meeting organizer specifies a future date and time for the meeting based on the attendees' schedules. Also specified may be a subject and body text indicating the meeting on which the new meeting is based, attachments, and a venue.

Unbeknownst to typical users, a follow-up meeting may also be created by copying and pasting the current meeting to an arbitrary date and time. Such action creates a duplicate of the original meeting including all the meeting particulars of the original meeting (e.g., subject, body text, venue, attendees), albeit scheduled at the arbitrary date and time. The meeting organizer may view the attendees' schedules to specify an appropriate date and time for the meeting, and may further modify the copied meeting particulars to indicate that the new meeting is based on a previous meeting.

Creation of a follow-up meeting therefore requires the meeting organizer to perform the same, if not more, steps as were performed to create an original meeting on which the follow-up meeting is based. This requirement creates inefficiencies any time a follow-up meeting is created, and may be particularly troublesome if the follow-up meeting is to be created during a time period allotted to the original meeting. Improved creation of follow-up meetings is therefore desired.

BRIEF DESCRIPTION OF THE DRAWINGS

FIG. 7 is a view of a Customer Relationship Management user interface displaying meeting particulars of a source meeting according to some embodiments.

FIG. 8 is a view of a Customer Relationship Management user interface displaying meeting particulars of a source meeting and a pull-down menu for creating a next meeting according to some embodiments.

FIG. 9 is a view of a Customer Relationship Management user interface displaying meeting particulars of a next meeting according to some embodiments.

DETAILED DESCRIPTION

Figure 1:
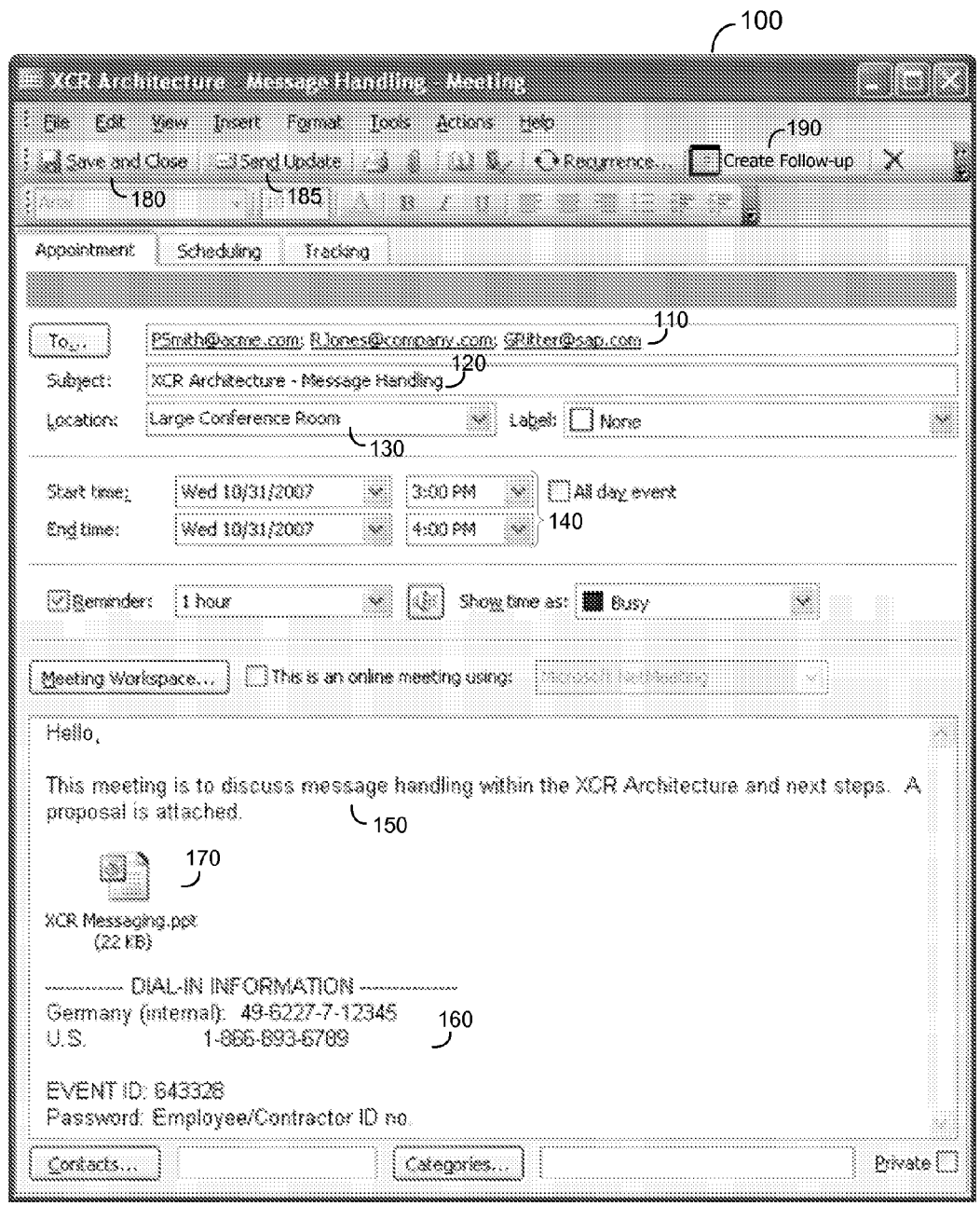
FIG. 1 is a view of a groupware client user interface displaying meeting particulars of a source meeting according to some embodiments.

FIG. 1 presents user interface 100 of a groupware client. According to some embodiments, the groupware client may comprise any application capable of creating a meeting associated with meeting particulars. For example, the groupware client may comprise Microsoft Outlook®, Lotus Notes®, Mozilla Thunderbird®, Qualcomm Eudora®, Google Gmail®, or any other suitable application that is or becomes known. The groupware client may be executed, and user interface 100 may be displayed, by any suitable hardware, including but not limited to a desktop computer, a laptop computer, a Personal Digital Assistant, a cellular telephone, a dedicated terminal, and a dedicated handheld device.

User interface 100 of FIG. 1 displays meeting particulars of an already-created meeting. More particularly, it will be assumed that the meeting represented in user interface 100 has been previously added to a user's calendar. User interface 100 is then displayed in response to an instruction from the user to open the meeting (e.g., double-clicking on an icon representing the meeting). In this regard, the meeting of user interface 100 may represented by an iCalendar object compliant with Request For Comments (RFC) 2445—Internet Calendaring and Scheduling Core Object Specification.

The meeting particulars associated with the meeting of interface 100 include attendees 110 (i.e., represented by their respective electronic mail addresses), meeting subject 120, meeting venue 130, and meeting date and time 140. The meeting particulars also include text block 150, dial-in information 160, and attachment 170. Embodiments are not limited to the meeting particulars shown in user interface 100, nor to the particular appearance, arrangement and function of user interface 100.

User interface 100 includes toolbar buttons 180 and 185. Toolbar button 180 allows the user to save the meeting and any changes to the meeting particulars, while toolbar button 185 allows the user to send the meeting and any such changes to attendees 110. According to some embodiments, selection of button 185 causes the groupware client to create an internet electronic mail message, to attach the meeting and its particulars to the electronic mail message (e.g., as an iCalendar object), and to send the electronic mail message to each of attendees 100.

The internet electronic mail message may comply with RFC 2822—Internet Message Format, and may also comply with one or more extensions to RFC 2822 (e.g., RFC 2045—Multipurpose Internet Mail Extensions (MIME) Part One: Format of Internet Message Bodies, RFC 2046—Multipurpose Internet Mail Extensions (MIME) Part Two: Media Types, RFC 2049—Multipurpose Internet Mail Extensions (MIME) Part Five: Conformance Criteria and Examples). Corresponding groupware clients of attendees 110 may receive the electronic mail message and import the attached meeting into their respective calendars.

The above-described elements of user interface 100 may be known to those in the art. Some embodiments further include a user interface element such as Create Follow-up toolbar button 190. A user may interact with (i.e., click on) button 190 to issue an instruction to create a next meeting based on the meeting of user interface 100, hereinafter identified as the "source" meeting. Other user interface elements for issuing such an instruction according to some embodiments will be described below.

Figure 2:
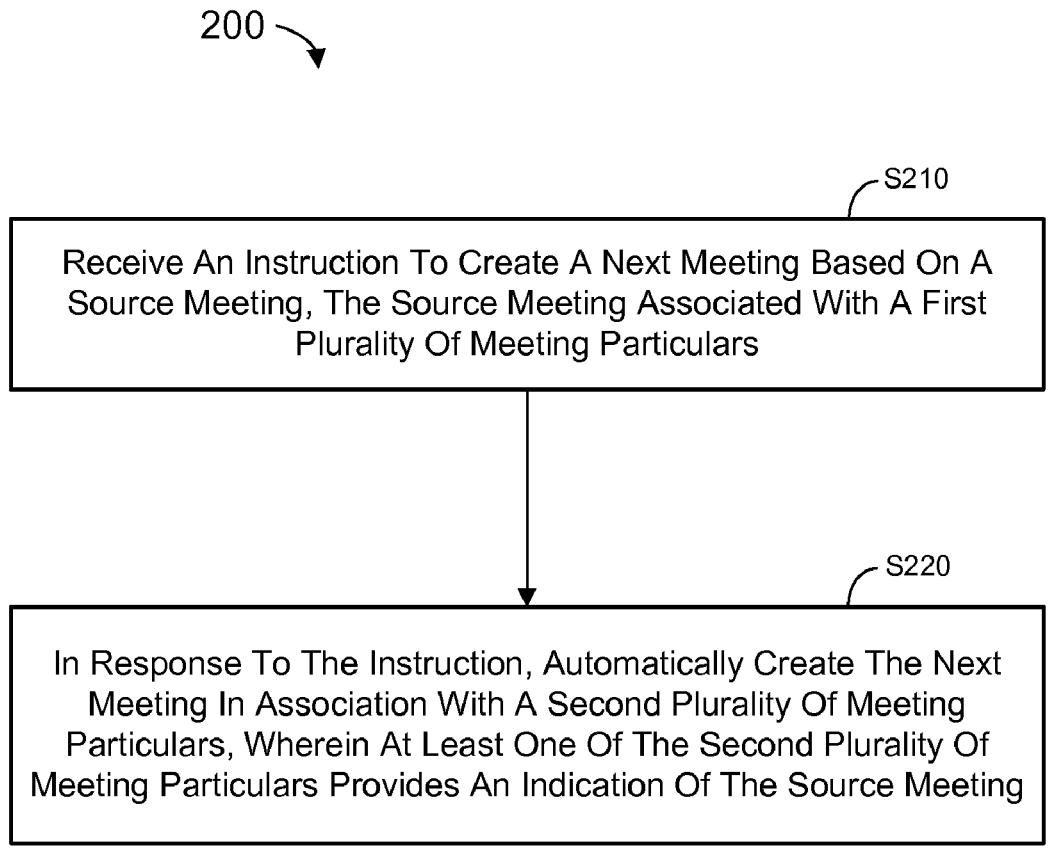
FIG. 2 is a flow diagram of a process according to some embodiments.

FIG. 2 is a flow diagram of process 200 which may be executed in response to the above instruction according to some embodiments. Although examples of process 200 will be described with respect to user interface 100 and the groupware client associated therewith, embodiments are not limited thereto.

Process 200 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an instruction is received to create a next meeting based on a source meeting, wherein the source meeting is associated with a first plurality of meeting particulars. In some embodiments, the source meeting is itself a "next" (i.e., follow-up) meeting based on a prior source meeting. The instruction may be received at S210 by detecting user interaction with a user interface element such as Create Follow-up button 190 of user interface 100.

Figure 3:
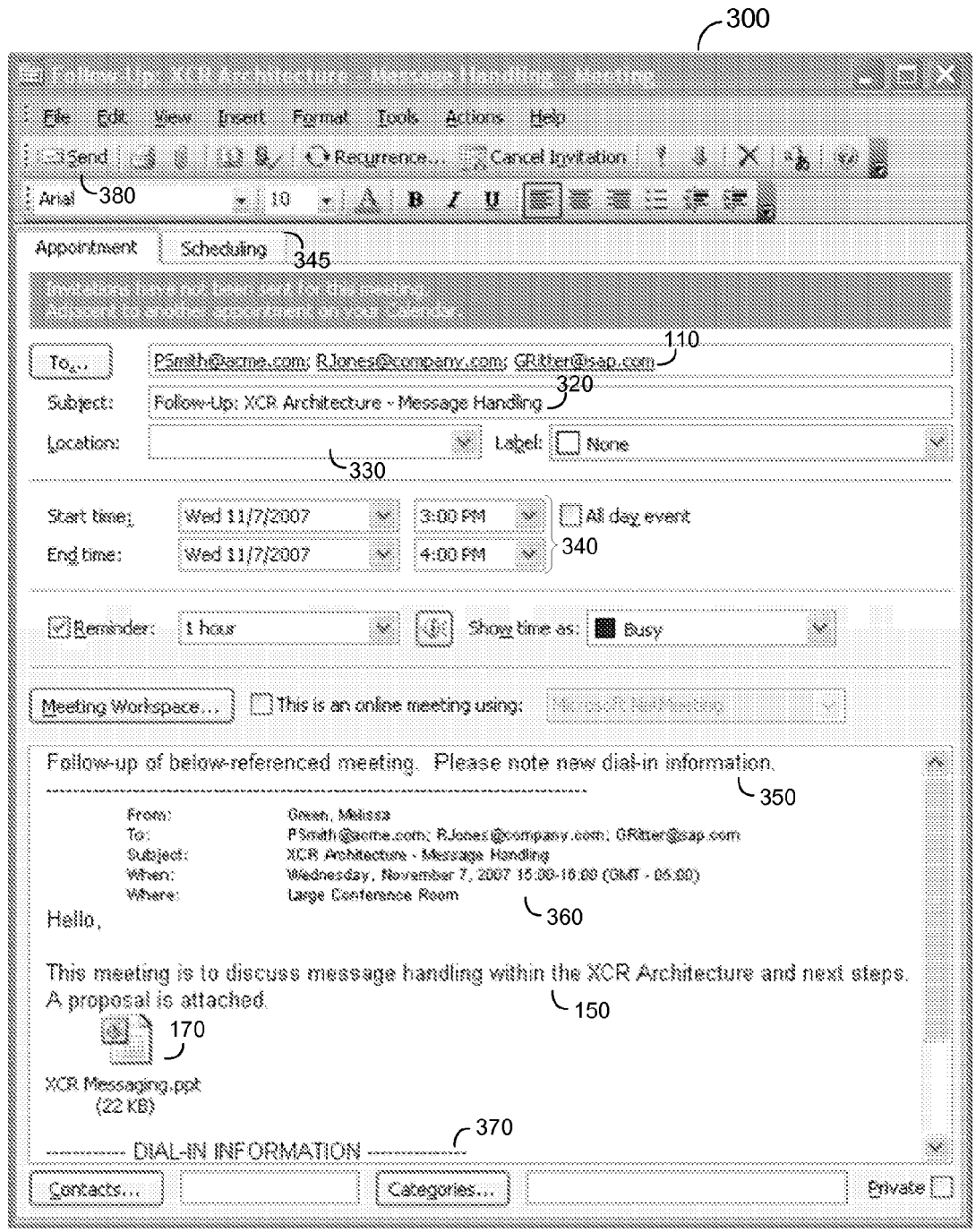
FIG. 3 is a view of a groupware client user interface displaying meeting particulars of a next meeting according to some embodiments.

The next meeting is automatically created at S220 in response to the received instruction. The next meeting is associated with a second plurality of meeting parameters, and at least one of the second plurality of meeting parameters provides an indication of the source meeting. User interface 300 of FIG. 3 illustrates a next meeting and an associated second plurality of meeting parameters that may be automatically created according to some embodiments of S220.

As shown, the second plurality of meeting particulars includes attendees 110 of the source meeting represented by user interface 100. Meeting subject 320 comprises both subject 120 of the source meeting and an indication of the source meeting (i.e., the text "Follow-Up"). This indication indicates that the next meeting of user interface 300 is a follow-up meeting, and therefore indicates the existence of its associated source meeting.

Venue 330 is not automatically assigned to the next meeting according to the illustrated embodiment. In some embodiments, the venue of the source meeting is automatically associated with the next meeting. Meeting date and time 340 of the next meeting may be determined based on a pre-defined rule (e.g., one week from the start time of the source meeting). According to some embodiments of S220, respective available time periods associated with each of attendees 110 are determined and a meeting time of the next meeting is determined based on the respective available time periods. Date and time 340 of the next meeting may be unassigned at S220 and completed by the user based on attendee schedules viewed via Scheduling tab 345.

The meeting particulars automatically created at S220 also include text block 350 and text block 360, each of which provides an indication of the source meeting. In this regard, text block 350 indicates the existence of its associated source meeting and text block 360 specifies some of the meeting particulars of the source meeting. Text block 150 and attachment 170 of the source meeting are also automatically associated as meeting particulars of the next meeting at S220. Dial-in information 370 of the next meeting may differ in whole or in part from dial-in information 160 of the source meeting.

According to some embodiments, text block 360 also includes a link to the source meeting. The link might comprise a text description and/or a hyperlink, which, if selected, causes the source meeting to open in a separate window.

The meeting particulars of the next meeting may be automatically determined at S220 based on any combination of rules and/or user-definable preferences. For example, according to some embodiments, no attendees are associated with the automatically-created next meeting, text block 360 is omitted from the automatically-created next meeting, and/or attachments of the source meeting are not associated with the next meeting. Generally, embodiments are not limited to second meeting particulars created as shown in user interface 300.

As mentioned above, the source meeting itself may comprise a follow-up meeting according to some embodiments. Accordingly, the "next" meeting comprises a follow-up of a follow-up meeting. Some embodiments may automatically determine meeting particulars of a follow-up of a follow-up differently than in the case of a "first" follow-up. For example, an indicator such as "Follow-up" might not be added to the subject of the "second" follow-up meeting. Also or alternatively, S220 may include a determination of whether the attendees of the first follow-up meeting are identical to the attendees of the source meeting, and, if not, the user may be presented with a query such as "Attendee _____ participated in the source meeting—Add to this meeting?".

Send button 380 may be selected to send the next meeting and the second plurality of meeting particulars to attendees 110 after process 200. Any of the second plurality of meeting particulars may be modified by the user after S220 and prior to selecting Send button 380. Selection of Send button 380 may cause the groupware client to create an internet electronic mail message including the second plurality of meeting particulars (e.g., as an attached iCalendar object), and to send the electronic mail message to each of attendees 100.

Figure 4:
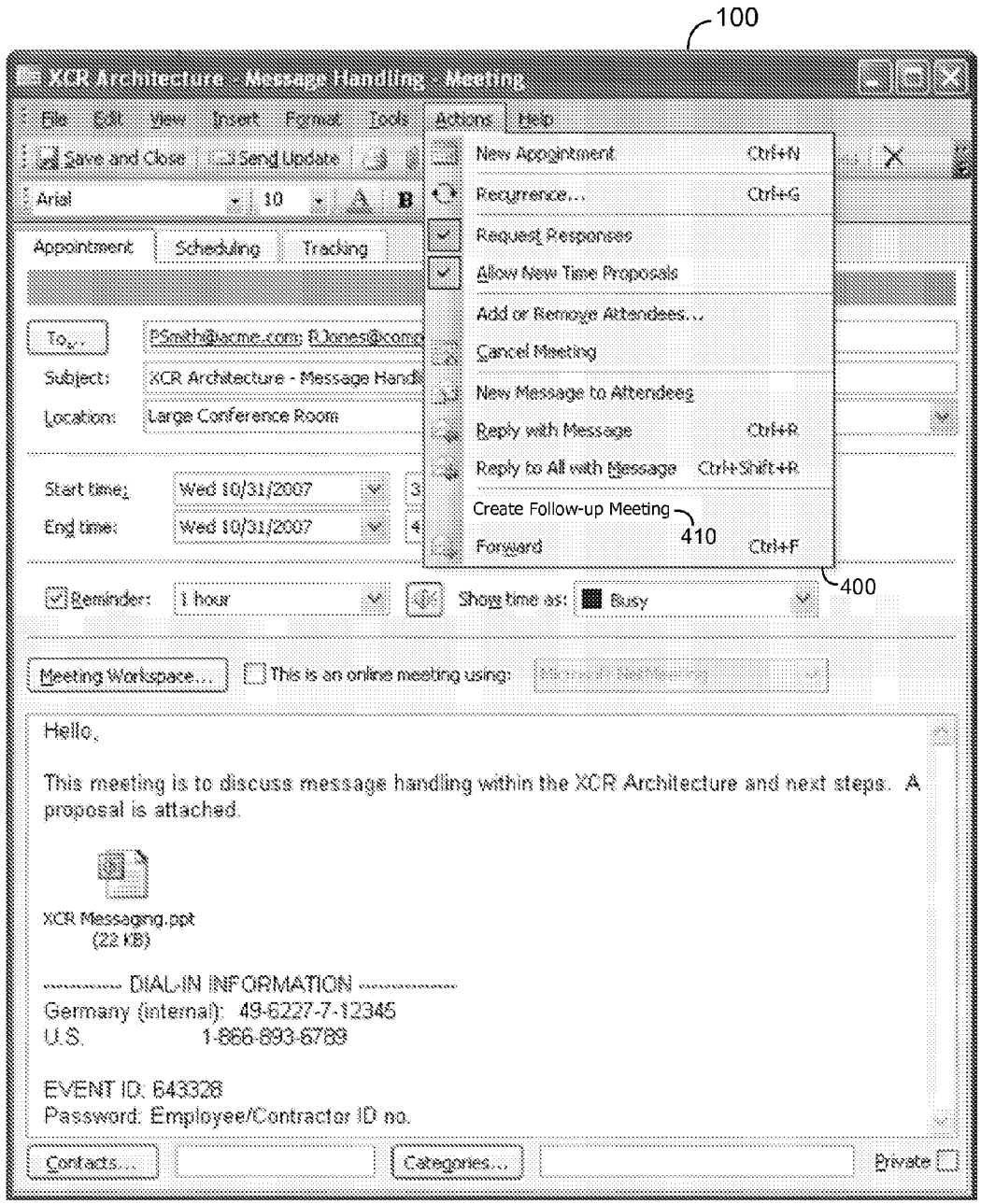
FIG. 4 is a view of a groupware client user interface displaying meeting particulars of a source meeting and a context menu for creating a next meeting according to some embodiments.

FIG. 4 is a view of user interface 100 according to some embodiments. As shown, pull-down menu 400 of user interface 100 includes Create Follow-up Meeting option 410. Accordingly, a user may interact with pull-down menu 400 (i.e., expose menu 400 and select option 410) in order to issue an instruction to create a next meeting. This interaction may be detected in order to receive the instruction at S210. Some embodiments provide one or both of toolbar button 190 and option 410 to initiate process 200.

Figure 5:
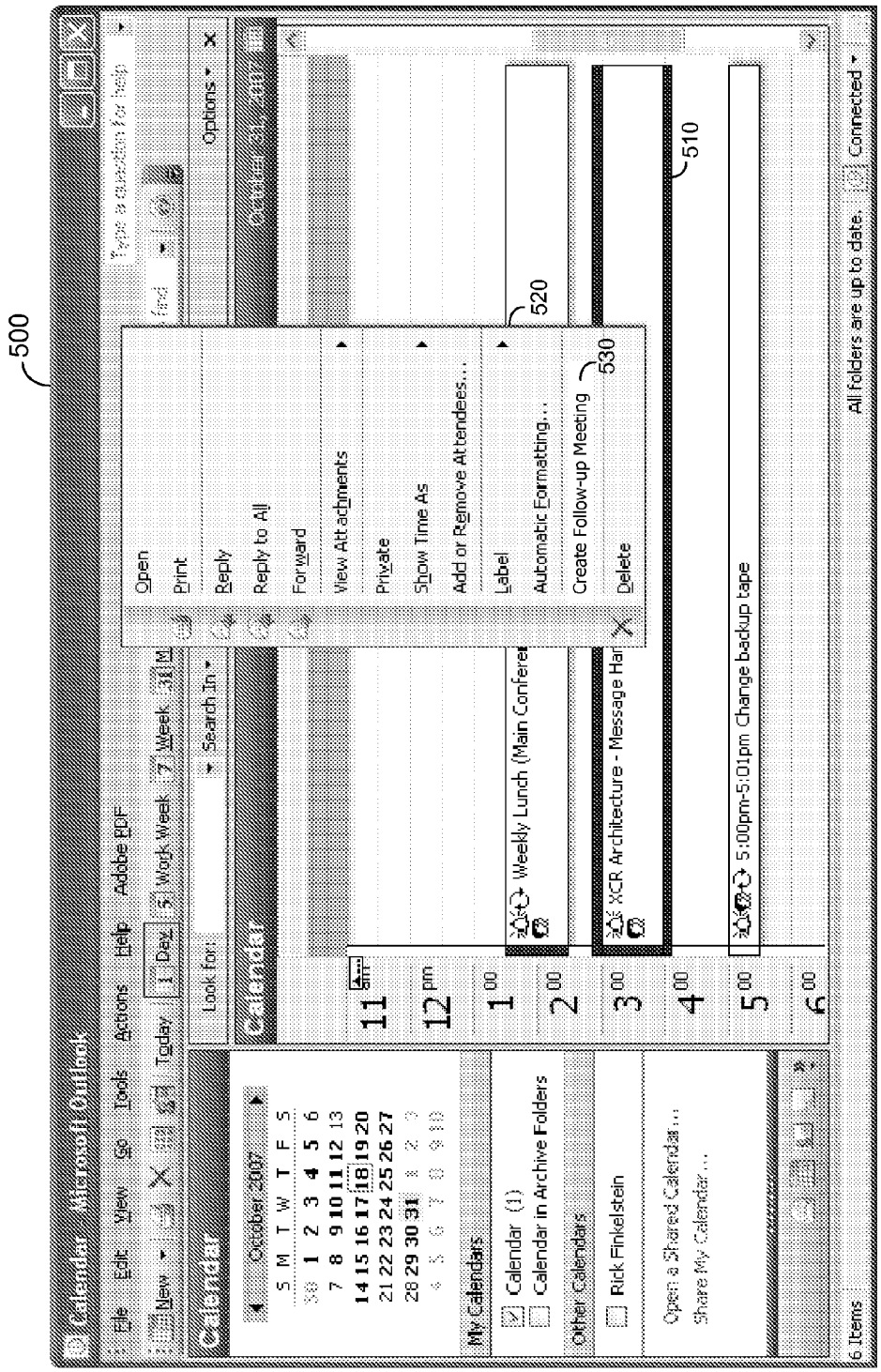
FIG. 5 is a view of a groupware client user interface displaying meeting particulars of a source meeting and a pull-down menu for creating a next meeting according to some embodiments.

FIG. 5 illustrates user interaction with still another user interface element that may be detected to receive an instruction to create a next (i.e., follow-up) meeting according to some embodiments. More specifically, user interface 500 comprises a "Calendar View" provided by a groupware client according to some embodiments. User interface 500 generally provides a view of calendar entries (including meetings) assigned to a selected time period.

Graphic 510 indicates a source meeting according to the present example. Context menu 520 is displayed in response to a detected right-click upon graphic 510. Context menu 520 includes Create Follow-up Meeting option 530. As described with respect to pull-down menu 400, a user may interact with context menu 520 (i.e., expose menu 520 and select option 530) in order to issue an instruction to create a next meeting. This interaction may in turn be detected at S210. Some embodiments may provide one or more of toolbar button 190, pull-down menu 400, and context menu 520 to initiate process 200.

Figure 6:
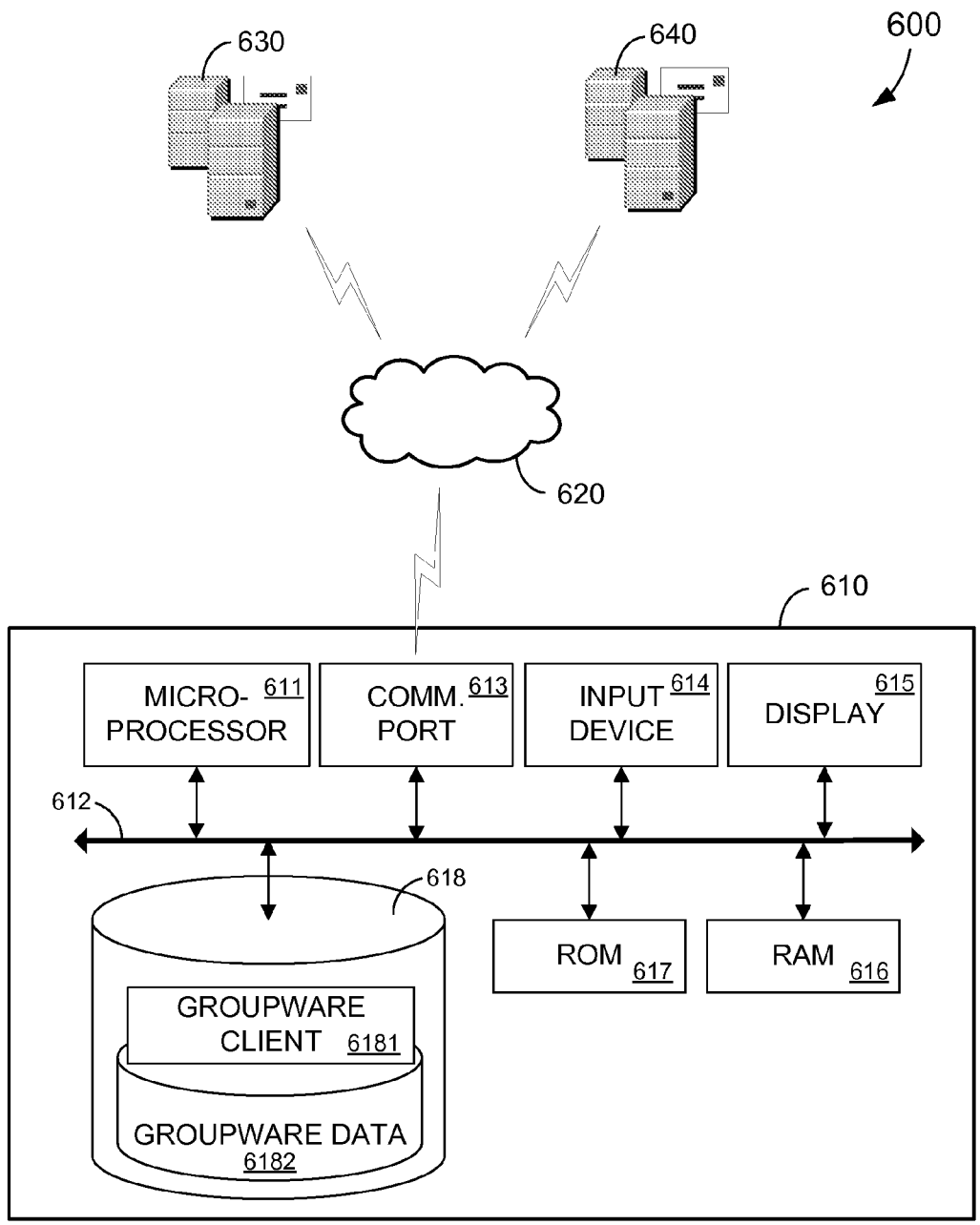
FIG. 6 is a block diagram of a computing system according to embodiments.

FIG. 6 is a block diagram of system 600 according to some embodiments. System 600 includes user device 610 to perform process 200 according to some embodiments. User device 610 may comprise any suitable hardware, including but not limited to a desktop computer, a laptop computer, a Personal Digital Assistant, a cellular telephone, a dedicated terminal, and a dedicated handheld device.

User device 610 includes microprocessor 611 in communication with communication bus 612. Microprocessor 611 may execute processor-executable process steps so as to control the elements of device 610 to provide desired functionality.

Also in communication with communication bus 612 is communication port 613. Communication port 613 is used to transmit data to and to receive data from devices external to device 610. Communication port 613 is therefore preferably configured with hardware suitable to physically interface with desired external devices and/or network connections. For example, communication port 613 may comprise an Ethernet connection to a local area network through which device 610 may transmit electronic mail messages including meeting particulars over the Web.

Input device(s) 614 and display 615 are also in communication with communication bus 612. Any known input device(s) may comprise input device 614, including a keyboard, mouse, touch pad, voice-recognition system, and any combination of these devices. A user may operate input device(s) 614 to manipulate user interface elements and to input meeting particulars as described above.

Display 615 may be an integral or separate CRT display, flat-panel display or the like used to display graphics and text in response to commands issued by microprocessor 611. Such graphics and text may comprise any of the interfaces described herein.

RAM 616 is connected to communication bus 612 to provide microprocessor 611 with fast data storage and retrieval. In this regard, processor-executable process steps being executed by microprocessor 611 are typically stored temporarily in RAM 616 and executed therefrom by microprocessor 611. ROM 617, in contrast, provides storage from which data can be retrieved but to which data cannot be stored. Accordingly, ROM 617 is used to store invariant process steps and other data, such as basic input/output instructions and data used during boot-up of device 610 or to control communication port 613. In some embodiments, one or both of RAM 616 and ROM 617 may communicate directly with microprocessor 611 instead of over communication bus 612.

Data storage device 618 stores, among other data, processor-executable process steps of groupware client 6181. Microprocessor 611 therefore executes the process steps of groupware client 6181 in order to control device 610 to create follow-up meetings according to some embodiments. Data storage device 618 also stores groupware data 6182, which may comprise stored electronic mail messages, contact information, meeting particulars, and/or other data. Groupware client 6181 may access groupware data 6182 to provide desired functionality. Data storage device 618 may store any number of other applications and/or data to provide other functionality to device 610.

Network 620 represents any suitable combination of networks with which device 610 may communicate. Network 620 may comprise a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Mail servers 630 and 640 are also in communication with network 620. Mail servers 630 and 640 may receive electronic mail messages including meeting particulars sent from device 610. In particular, mail server 630 receives electronic mail messages sent to meeting attendees having electronic mail addresses with which server 630 is associated.

Two or more of the elements of system 600 may be located remote from one another and may communicate with one another via a network and/or a dedicated connection. Moreover, each displayed element of system 600 may comprise any number of hardware and/or software elements suitable to provide the functions described herein, some of which are located remote from each other. Other topologies may be used in conjunction with other embodiments.

Figure 7:
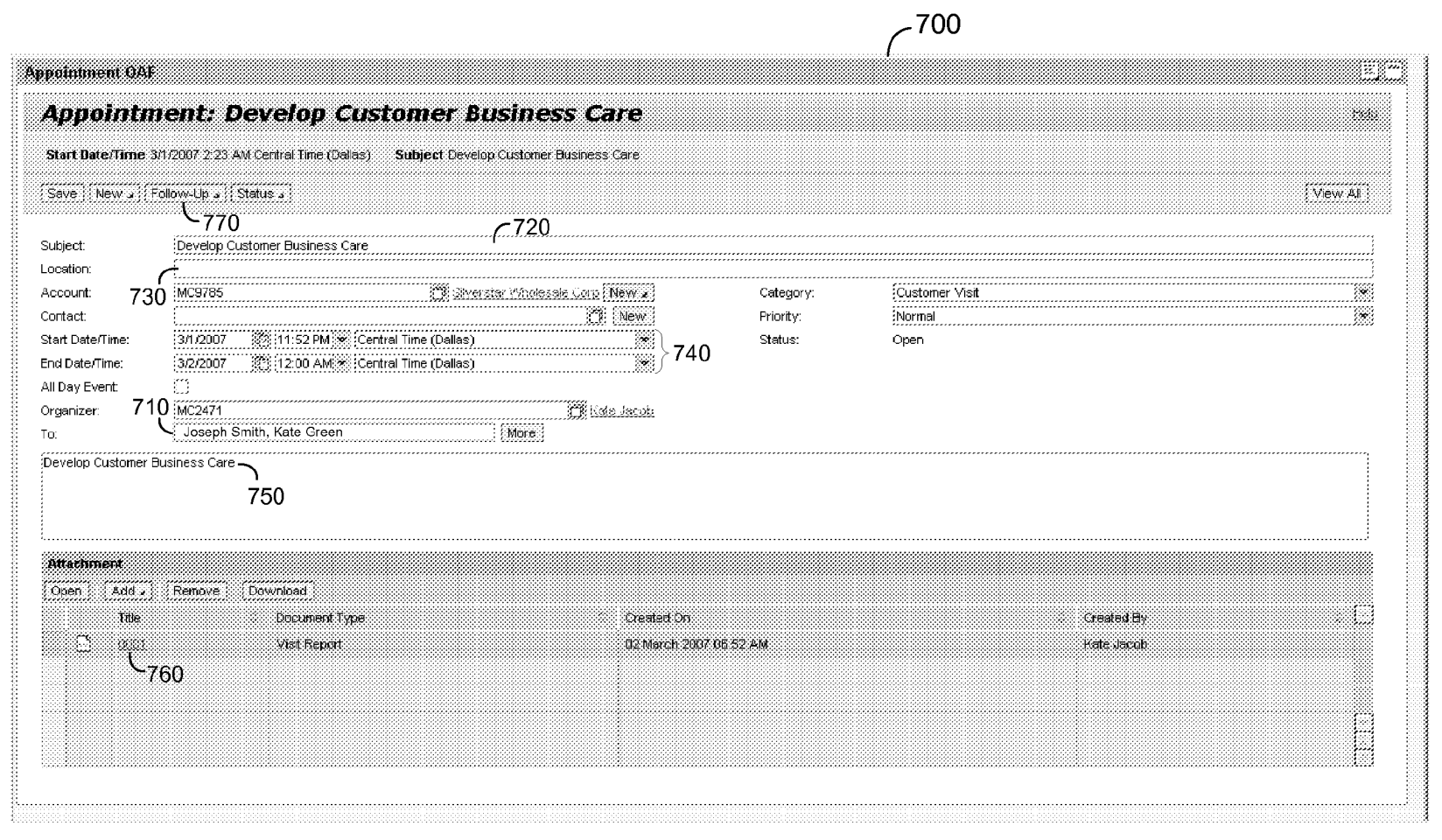

FIG. 7 includes user interface 700 of a Customer Relationship Management (CRM) application according to some embodiments. User interface 700 may comprise a software application that communicates with a business process platform (e.g., an SAP application platform based on SAP Netweaver®) via proprietary interfaces. In some embodiments, user interface 700 is presented by a Web browser in communication with a business process platform. The Web browser may include an execution engine to execute code (e.g., JAVA® code or Flash® code) to provide secure communication with the business process platform.

User interface 700 may be displayed by any suitable device. For example, user interface 700 may be displayed by device 610, which may include any necessary software to support the aforementioned proprietary interfaces (e.g., a proprietary client application) or execution engine (e.g., a Web browser). A device to display user interface 700 is capable of communication (including sporadic communication—e.g., mobile devices) with the business process platform.

User interface 700 displays meeting particulars of an already-created meeting. User interface 700 may be displayed in response to an instruction from a user to open the meeting (e.g., double-clicking on an icon representing the meeting). Similar to user interface 100 of FIG. 1, the meeting particulars associated with the meeting of interface 700 may include notified parties (i.e., "attendees" in a groupware environment) 710, meeting subject 720, meeting venue 730, meeting date and time 740, text block 750, and attachment 760. A meeting according to some embodiments may be associated with only one person (e.g., a meeting organizer), in which case the meeting may be referred to as an appointment.

The meeting of user interface 700 may be represented by a business object residing within the business process platform. Such a business object may comprise business logic and/or data and exhibit any suitable structure. In some business software environments, such as in enterprise service architecture systems, business objects may be defined according to a node structure that may specify corresponding data elements and behaviors to be associated with the business objects. A business object may include nodes, attributes, queries and actions. Development of a business software environment may involve defining an object model that specifies interrelationships of business objects to be implemented in an application framework.

User interface 700 also includes Follow-up button 770. A user may interact with (i.e., click on) button 770 to issue an instruction to create a next meeting based on the meeting of user interface 700. This interaction may be detected in order to receive the instruction at S210. According to some embodiments, selection of button 770 causes display of a pull-down menu from which a Create Follow-Up option may be selected.

Figure 8:
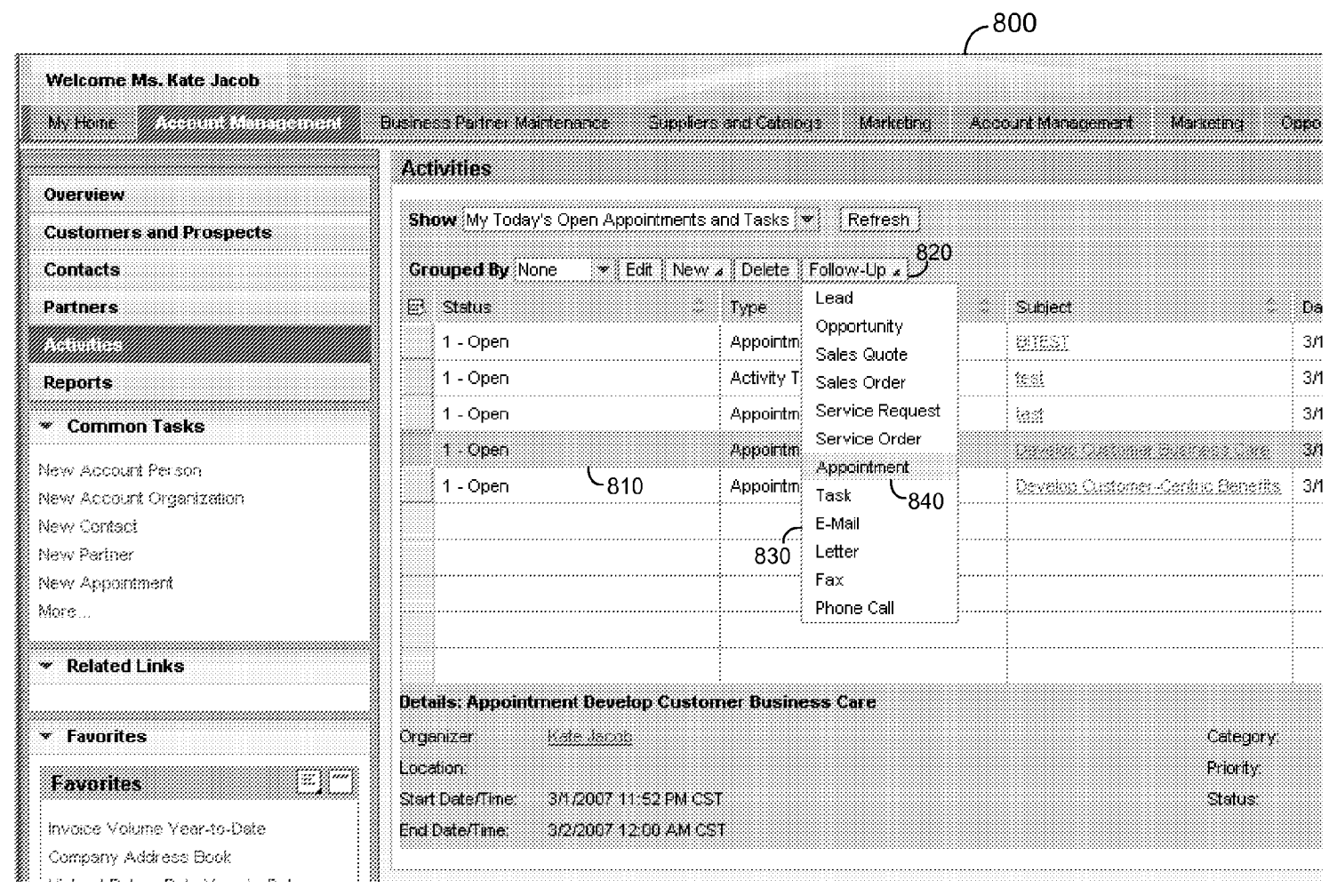

User interface 800 of FIG. 8 depicts a different representation of a source meeting according to some embodiments. Like the Calendar View of interface 500, user interface 800 provides a view of calendar entries (including meetings) which satisfy a specified filter (e.g., My Today's Open Appointments and Tasks). Row 810 indicates a source meeting according to the present example.

Follow-up button 820 has been selected, resulting in display of pull-down menu 830. Option 840 may then be selected in order to issue an instruction to create a next meeting based on the source meeting highlighted in row 810. This interaction may be detected at S210 to initiate automatic creation of the next meeting as described above.

Figure 9:
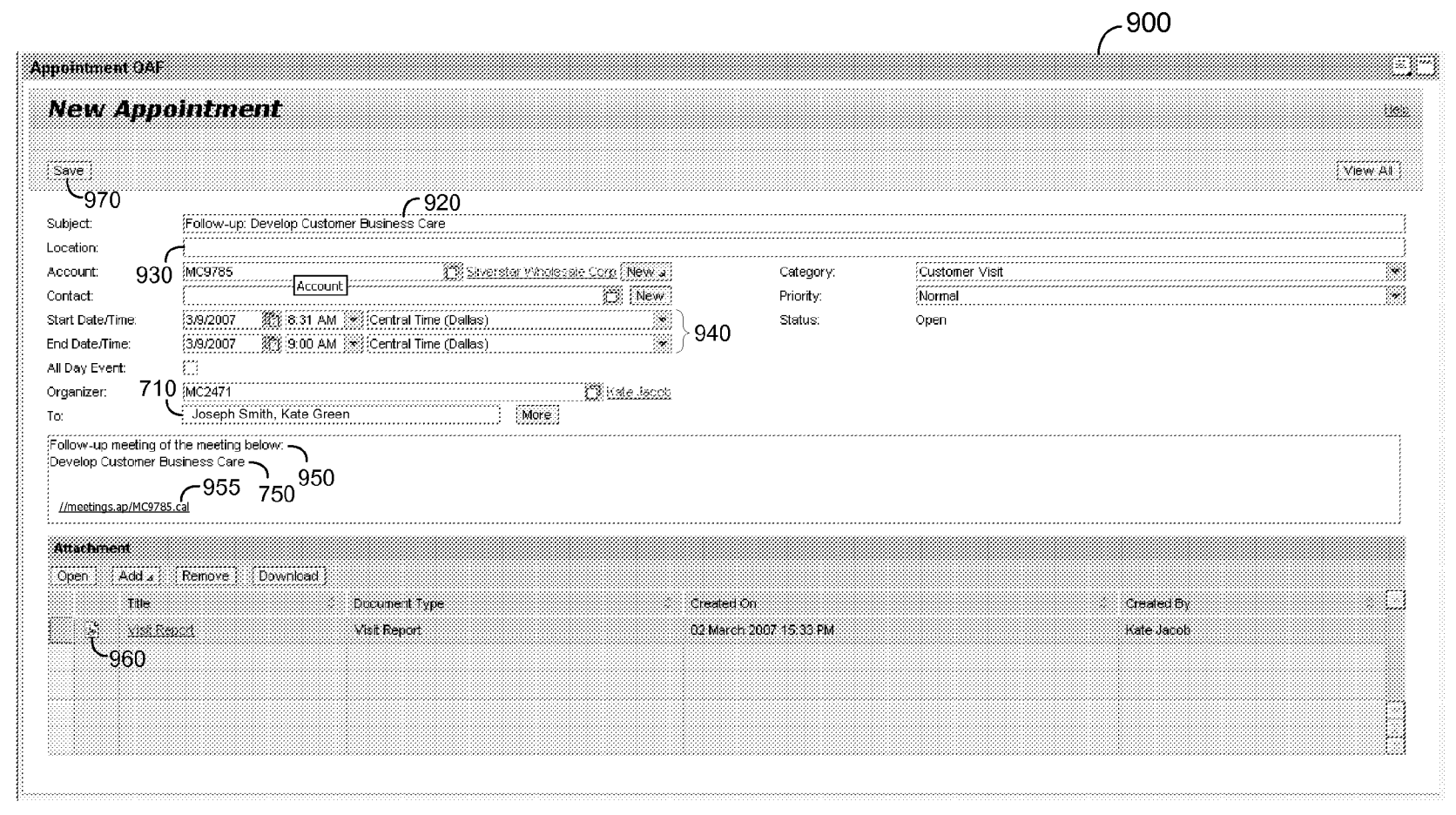

FIG. 9 illustrates user interface 900 representing a next meeting that may be automatically created at S220 based on the source meeting of FIGS. 7 and 8. As shown, the second plurality of meeting particulars includes notified parties 710 of the source meeting, meeting subject 920 comprises both subject 720 of the source meeting and an indication of the source meeting (i.e., the text "Follow-Up"). Venue 730 of the source meeting has been automatically associated with the next meeting, and meeting date and time 940 of the next meeting has been associated with the next meeting based on a pre-defined rule or determination.

The meeting particulars of the next meeting automatically created at S220 also include text block 950 to indicate the existence of the source meeting and text block 750 of the source meeting. According to the illustrated embodiment, text block 950 also includes hyperlink 955, which may be selected to cause the source meeting to open in a separate window. Attachment 960 of the next meeting comprises a most-recent version of attachment 760 of the source meeting. S220 may therefore comprise determination of a most-recent version of a source meeting attachment. As described above, the meeting particulars of the next meeting may be automatically determined at S220 based on any combination of rules and/or definable preferences. The preferences may be defined per user and/or per installation.

A user may modify any of the second plurality of meeting particulars automatically created at S220 and shown in FIG. 9. The user may then select Save button 970 to cause instantiation of a business object representing the next meeting. Such a business object may be associated with the calendar of the meeting organizer, any listed notified parties, and/or any other suitable entity.

The embodiments described herein are solely for the purpose of illustration. Those in the art will recognize other embodiments may be practiced with modifications and alterations limited only by the claims.

What is claimed is:

1. A computer-implemented method comprising:
    presenting a first user interface of a previously-created source meeting, the first user interface displaying a first plurality of meeting particulars associated with the source meeting and displaying a first user interface element;
    detecting a user interaction with the user interface element; and
    in response to the detection of the user interaction, automatically creating a next meeting associated with a second plurality of meeting particulars, and presenting a second user interface of the next meeting, the second user interface displaying the second plurality of meeting particulars,
    wherein one or more of the second plurality of meeting particulars is identical to one or more of the first plurality of meeting particulars.

2. A method according to claim 1, wherein the second plurality of meeting particulars comprises a second meeting subject, and
    wherein the second meeting subject comprises a first meeting subject of the first plurality of meeting particulars.

3. A method according to claim 2, wherein the second meeting subject comprises an indicator of the source meeting, and
    wherein the at least one of the second plurality of meeting particulars comprises the second meeting subject.

4. A method according to claim 2, wherein the second plurality of meeting particulars comprises a second plurality of attendees, and
    wherein the second plurality of attendees comprises a first plurality of attendees of the first plurality of meeting particulars.

5. A method according to claim 2, wherein the second plurality of meeting particulars comprises a second text block,
    wherein the second text block comprises a first text block of the first plurality of meeting particulars, and
    wherein the at least one of the second plurality of meeting particulars comprises the second text block.

6. A method according to claim 5, wherein the second plurality of meeting particulars comprise one or more attachments, and
    wherein the one or more attachments comprise a first attachment of the first plurality of meeting particulars.

7. A method according to claim 1, wherein the second plurality of meeting particulars comprises a second meeting time, and wherein automatically creating the next meeting comprises:
    determining respective available time periods associated with a first plurality of attendees of the first plurality of meeting particulars; and
    determining the second meeting time based on the respective available time periods.

8. A method according to claim 1, wherein the second plurality of meeting particulars comprises a second meeting time, and wherein automatically creating the next meeting comprises:

determining the second meeting time based on a pre-defined rule.

9. A method according to claim 1, wherein automatically creating the next meeting comprises:
performing a create with reference operation to create an instance of a meeting object.

10. A method according to claim 1, wherein automatically creating the next meeting comprises:
automatically determining at least one of the second plurality of meeting particulars based on one or more definable preferences.

11. A method according to claim 1, wherein receiving the instruction to create the next meeting comprises:
detecting user interaction with a user interface element.

12. A method according to claim 11, wherein the user interface element comprises at least one of a toolbar button, a context menu, a pull-down menu, and a command line prompt.

13. A method according to claim 1, wherein the second plurality of meeting particulars comprises a second text block, and
wherein the second text block comprises a link to the source meeting.

14. A medium storing processor-executable program code, the program code comprising:
code to present a first user interface of a previously-created source meeting, the first user interface displaying a first plurality of meeting particulars associated with the source meeting and displaying a first user interface element;
code to detect a user interaction with the user interface element; and
code to automatically create, in response to the detection of the user interaction, a next meeting associated with a second plurality of meeting particulars, and to present a second user interface of the next meeting, the second user interface displaying the second plurality of meeting particulars,
wherein one or more of the second plurality of meeting particulars is identical to one or more of the first plurality of meeting particulars.

15. A medium according to claim 14, wherein the second plurality of meeting particulars comprises a second meeting subject, and
wherein the second meeting subject comprises a first meeting subject of the first plurality of meeting particulars.

16. A medium according to claim 15, wherein the second meeting subject comprises an indicator of the source meeting, and
wherein the at least one of the second plurality of meeting particulars comprises the second meeting subject.

17. A medium according to claim 15, wherein the second plurality of meeting particulars comprises a second plurality of attendees, and
wherein the second plurality of attendees comprises a first plurality of attendees of the first plurality of meeting particulars.

18. A medium according to claim 15, wherein the second plurality of meeting particulars comprises a second text block,
wherein the second text block comprises a first text block of the first plurality of meeting particulars, and
wherein the at least one of the second plurality of meeting particulars comprises the second text block.

19. A medium according to claim 18, wherein the second plurality of meeting particulars comprise one or more attachments, and wherein the one or more attachments comprise a first attachment of the first plurality of meeting particulars.

20. A medium according to claim 14, wherein the second plurality of meeting particulars comprises a second meeting time, and wherein the code to automatically create the next meeting comprises:
code to determine respective available time periods associated with a first plurality of attendees of the first plurality of meeting particulars; and
code to determine the second meeting time based on the respective available time periods.

21. A medium according to claim 14, wherein the second plurality of meeting particulars comprises a second meeting time, and wherein the code to automatically create the next meeting comprises:
code to determine the second meeting time based on a pre-defined rule.

22. A medium according to claim 14, wherein the code to automatically create the next meeting comprises:
code to perform a create with reference operation to create an instance of a meeting object.

23. A medium according to claim 14, wherein the code to automatically create the next meeting comprises:
code to automatically determine at least one of the second plurality of meeting particulars based on one or more definable preferences.

24. A medium according to claim 14, wherein the code to receive the instruction to create the next meeting comprises:
code to detect user interaction with a user interface element.

25. A medium according to claim 24, wherein the user interface element comprises at least one of a toolbar button, a context menu, a pull-down menu, and a command line prompt.

26. A medium according to claim 14, wherein the second plurality of meeting particulars comprises a second text block, and
wherein the second text block comprises a link to the source meeting.

27. An apparatus comprising:
a display;
a memory storing processor-executable program code; and
a processor in communication with the memory and the display, the processor to execute the processor-executable program code to:
present, on the display, a first user interface of a previously-created source meeting, the first user interface displaying a first plurality of meeting particulars associated with the source meeting and displaying a first user interface element;
detect a user interaction with the user interface element; and
automatically create, in response to the detection of the user interaction, a next meeting associated with a second plurality of meeting particulars, and to present, on the display, a second user interface of the next meeting, the second user interface displaying the second plurality of meeting particulars,
wherein one or more of the second plurality of meeting particulars is identical to one or more of the first plurality of meeting particulars.

28. A medium according to claim 27, wherein the second plurality of meeting particulars comprises a second meeting subject, and
wherein the second meeting subject comprises a first meeting subject of the first plurality of meeting particulars.

29. A medium according to claim 28, wherein the second meeting subject comprises an indicator of the source meeting, and wherein the at least one of the second plurality of meeting particulars comprises the second meeting subject.

30. A medium according to claim 28, wherein the second plurality of meeting particulars comprises a second plurality of attendees, and wherein the second plurality of attendees comprises a first plurality of attendees of the first plurality of meeting particulars.

31. A medium according to claim 28, wherein the second plurality of meeting particulars comprises a second text block, wherein the second text block comprises a first text block of the first plurality of meeting particulars, and wherein the at least one of the second plurality of meeting particulars comprises the second text block.

32. A medium according to claim 31, wherein the second plurality of meeting particulars comprise one or more attachments, and wherein the one or more attachments comprise a first attachment of the first plurality of meeting particulars.

33. A medium according to claim 27, wherein the second plurality of meeting particulars comprises a second text block, and wherein the second text block comprises a link to the source meeting.

* * * * *